United States Patent
Field et al.

(10) Patent No.: US 9,718,566 B2
(45) Date of Patent: Aug. 1, 2017

(54) STACKABLE SATELLITES AND METHOD OF STACKING SAME

(71) Applicant: WorldVu Satellites Limited, St Helier, Jersey (GB)

(72) Inventors: Daniel W. Field, Sunnyvale, CA (US);
Armen Askijian, Sunnyvale, CA (US);
James Grossman, Sunnyvale, CA (US);
Alexander D. Smith, San Jose, CA (US)

(73) Assignee: WorldVu Satellites Limited, St Helier (JE)

( * ) Notice: Subject to any disclaimer, the term of this patent is extended or adjusted under 35 U.S.C. 154(b) by 237 days.

(21) Appl. No.: 14/700,466

(22) Filed: Apr. 30, 2015

(65) Prior Publication Data

US 2016/0318635 A1    Nov. 3, 2016

(51) Int. Cl.
*B64G 1/00*     (2006.01)
*B64G 1/64*     (2006.01)
*B64G 1/10*     (2006.01)

(52) U.S. Cl.
CPC ............... *B64G 1/641* (2013.01); *B64G 1/10* (2013.01); *B64G 2001/643* (2013.01)

(58) Field of Classification Search
CPC . B64G 1/10; B64G 1/64; B64G 1/641; B64G 1/645; B64G 2001/64; B64G 2001/641; B64G 2001/643
See application file for complete search history.

(56) References Cited

U.S. PATENT DOCUMENTS

| | | | | |
|---|---|---|---|---|
| 5,052,640 | A * | 10/1991 | Chang | B64G 1/002 136/292 |
| 5,199,672 | A * | 4/1993 | King | B64G 1/007 244/164 |
| 5,411,226 | A * | 5/1995 | Jones | B64G 1/641 244/173.3 |
| 5,522,569 | A | 6/1996 | Steffy et al. | |
| 5,884,866 | A | 3/1999 | Steinmeyer et al. | |
| 6,276,639 | B1 | 8/2001 | Hornung et al. | |
| 6,494,406 | B1 * | 12/2002 | Fukushima | B64G 1/002 244/173.3 |
| 6,637,702 | B1 | 10/2003 | McCandless | |
| 7,905,453 | B2 | 3/2011 | Benedict et al. | |

(Continued)

OTHER PUBLICATIONS

Authorized Officer: Shane Thomas, "International Search Report and the Written Opinion" dated Aug. 12, 2016 Issued in counterpart International PCT Application No. PCT/US16/29509.

(Continued)

*Primary Examiner* — Philip J Bonzell
(74) *Attorney, Agent, or Firm* — Kaplan Breyer Schwarz, LLP (57) ABSTRACT

A stackable satellite includes a satellite frame and at least one vertical pillar attached to the frame. The vertical pillar has an upper end and a lower end. The upper end is coupled to the lower end of the vertical pillar of the satellite above and the lower end is coupled to the upper end of the vertical pillar of the satellite below. The vertical pillar receives substantially all of the vertical load of the stackable satellite and any other satellites stacked above. Use of such vertical pillars removes the need for a dispenser or substantially lightens the dispenser mass to allow substantially more satellites to be carried in a payload.

20 Claims, 6 Drawing Sheets

(56) References Cited

U.S. PATENT DOCUMENTS

| | | |
|---|---|---|
| 8,550,408 B2 | 10/2013 | Ross et al. |
| 8,789,797 B2 | 7/2014 | Darooka |
| 2008/0237399 A1 | 10/2008 | Caplin et al. |
| 2014/0039729 A1 | 2/2014 | Puig-Suari et al. |
| 2014/0319283 A1 | 10/2014 | Holemans et al. |

OTHER PUBLICATIONS

Image 15, http://users.telenet.be/filip.merckx/Image15.jpg.
"Orbcomm (satellite)", http://en.wikipedia.org/wiki/Orbcomm_(satellite).
"Satellite M2M Networks", dated 2016, http://www.orbcomm.com/networks/satellite.
"StarTrak—Satellite Communications", http://www.starpig.com/Satellite_Communicator.htm.

* cited by examiner

STACKABLE SATELLITES AND METHOD OF STACKING SAME

TECHNICAL FIELD

The present invention is related to satellites, and in particular, satellite structure design for maximizing payload in a launch vehicle.

BACKGROUND OF THE INVENTION

A satellite support system typically connects satellites to a launch vehicle through a specified interface plane and bolt pattern. Individual satellites can attach directly to such an interface. For launching multiple satellites such as a group of medium earth orbit (MEO) or low earth orbit (LEO) satellites, the support system typically uses a dispenser having a primary cylinder that is cantilevered off of the interface plane. Individual satellites can then be attached radially around the perimeter of the primary cylinder.

One drawback to such a satellite support system is that the dispenser takes up a large volume and mass to meet the structural requirements of launch. Typically, 10-20% of the total payload mass goes into the dispenser and associated mechanical and electrical interfaces, but provides no benefit after launch and separation.

To address the weight issue, an attempt was made to vertically stack multiple satellites having the same dimensions without a central dispenser. One major problem of that approach was that because the bottom satellite carried all of the weight of the satellites above it. Since all satellites are identical, each satellite had to be designed to support the maximum number of satellites stacked above. As an example, if ten satellites are stacked, each satellite would have to be designed to take the vertical load of nine satellites regardless of where the satellite is positioned within the stack. Needless to say, the resulting stack of satellites was much heavier than it needed to be.

Therefore, it would be desirable to provide a satellite launch support system that reduces or even eliminates the dispenser mass without compromising the required structural rigidity and strength during launch.

BRIEF SUMMARY OF THE DISCLOSURE

According to one aspect of the present invention, a stackable satellite comprising a frame and at least one vertical pillar attached to the frame is provided. The vertical pillar has an upper end and a lower end. The upper end is coupled to the lower end of the vertical pillar on the satellite above and the lower end is coupled to the upper end of the vertical pillar on the satellite below. The vertical pillar receives substantially all of the vertical load of the attached stackable satellite and any upper stackable satellites. Use of such vertical pillars removes the need for a dispenser or substantially lightens the dispenser mass to allow substantially more satellites to be carried in a payload.

According to another aspect of the present invention, a method of preparing a payload containing a plurality of stackable satellites is provided. The method includes vertically positioning the stackable satellites over a base. Each stackable satellite having a frame and at least one vertical pillar attached to the frame. The satellites are stacked such that the lower end of the vertical pillar is coupled to an upper end of the vertical pillar on the satellite below and the upper end is coupled to the lower end of the vertical pillar of the satellite above. When stacked in this manner, the vertical pillar of the satellite receives substantially all of the vertical load of the satellite it is attached to and any satellites stacked above. The method further includes fastening the stacked satellites to the base of the launch vehicle by applying downward pressure through the vertical pillars of the stackable satellites.

DETAILED DESCRIPTION OF THE INVENTION

Briefly, the disclosure described herein is a novel satellite design and a method where multiple satellites are stacked in a launch vehicle without using a common heavy dispenser. The satellites are stacked directly over each other through vertical pillars that carry substantially all of the launch vehicle loads. The vertical pillars are designed to carry the main static and dynamic loads of the satellites above. The pillar geometry is specifically designed for these loads to bypass the rest of the satellite structure and transmit directly from pillar to pillar until the bottom pillar carries the load into the launch vehicle. In this way, only the vertical pillars are designed for very high strength and stiffness without requiring the same performance criteria from the rest of the satellite structure such as the frame. Additionally, these load paths can be made more effective by preloading them in compression by compressing the stack of satellites. The preload resists tensile loads in the opposite direction so that the loads are not reversible and nonlinear gapping responses are reduced or eliminated.

The use of such vertical pillars either removes the need for a dispenser or substantially lightens the dispenser mass. Once the payload reaches orbit, each satellite in the stack would then separate from the launch vehicle individually.

Figure 1:
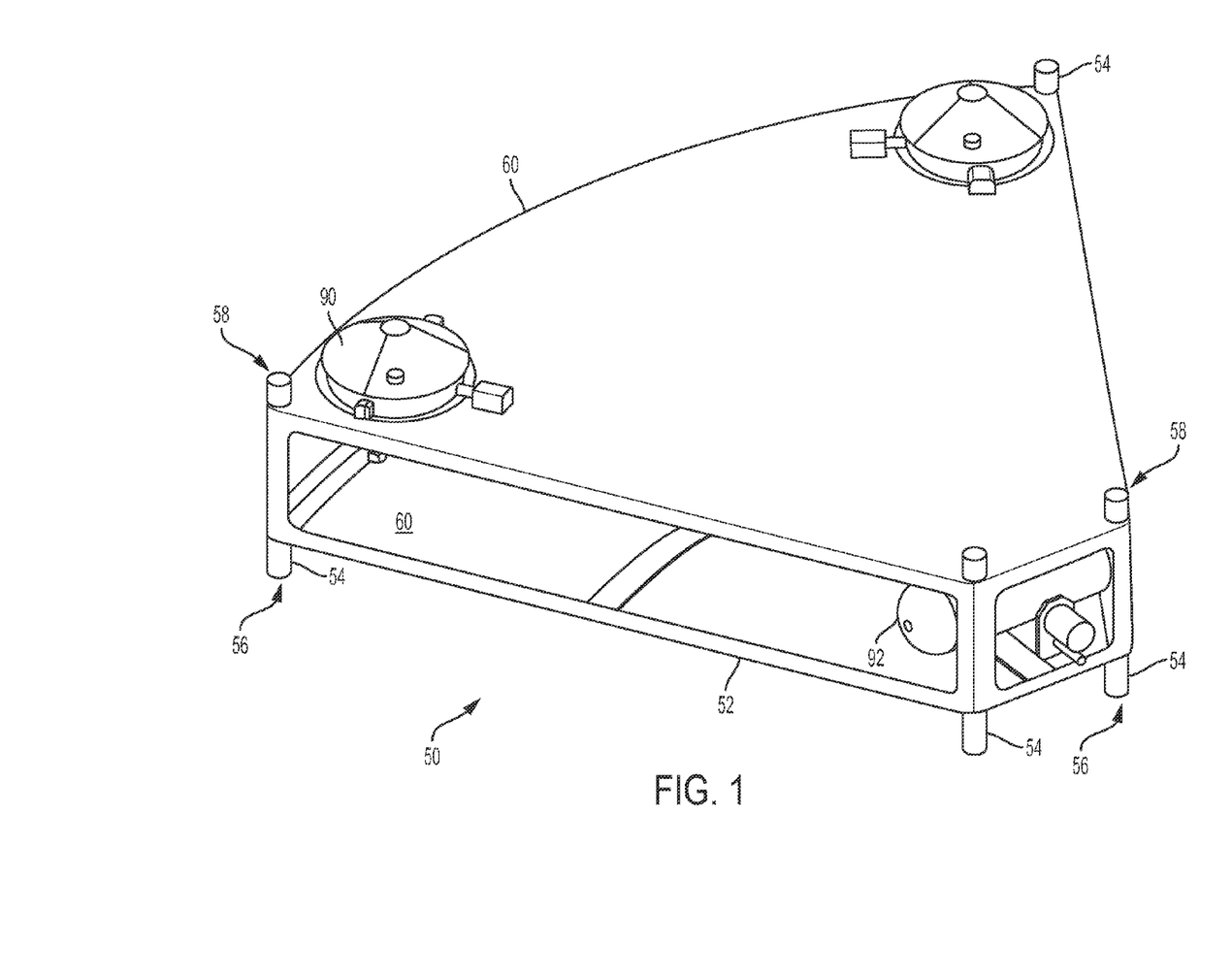
FIG. 1 depicts a perspective view of a stackable satellite according to one aspect of the present invention.

FIG. 1 depicts a perspective view of a stackable satellite according to one aspect of the present invention. A stackable satellite 50 includes a frame 52, vertical pillars 54 having a lower end 56 and upper end 58 and a plurality of panels 60 that support various satellite components such as antennas 90, fuel tank 92, propulsion systems, solar panels and the like. The vertical pillars 54 and the panels 60 are typically attached to the satellite frame 52 with bolts. As shown, there are four vertical pillars 54 located on each corner of the frame 52 and the height of the satellite frame 52 is uniform throughout, which promotes efficiency in stacking.

While the stackable satellite 50 is shown with four vertical pillars 54, the principles disclosed herein can apply to any satellite with one or more pillars although three or more pillars are preferable.

Figure 2:
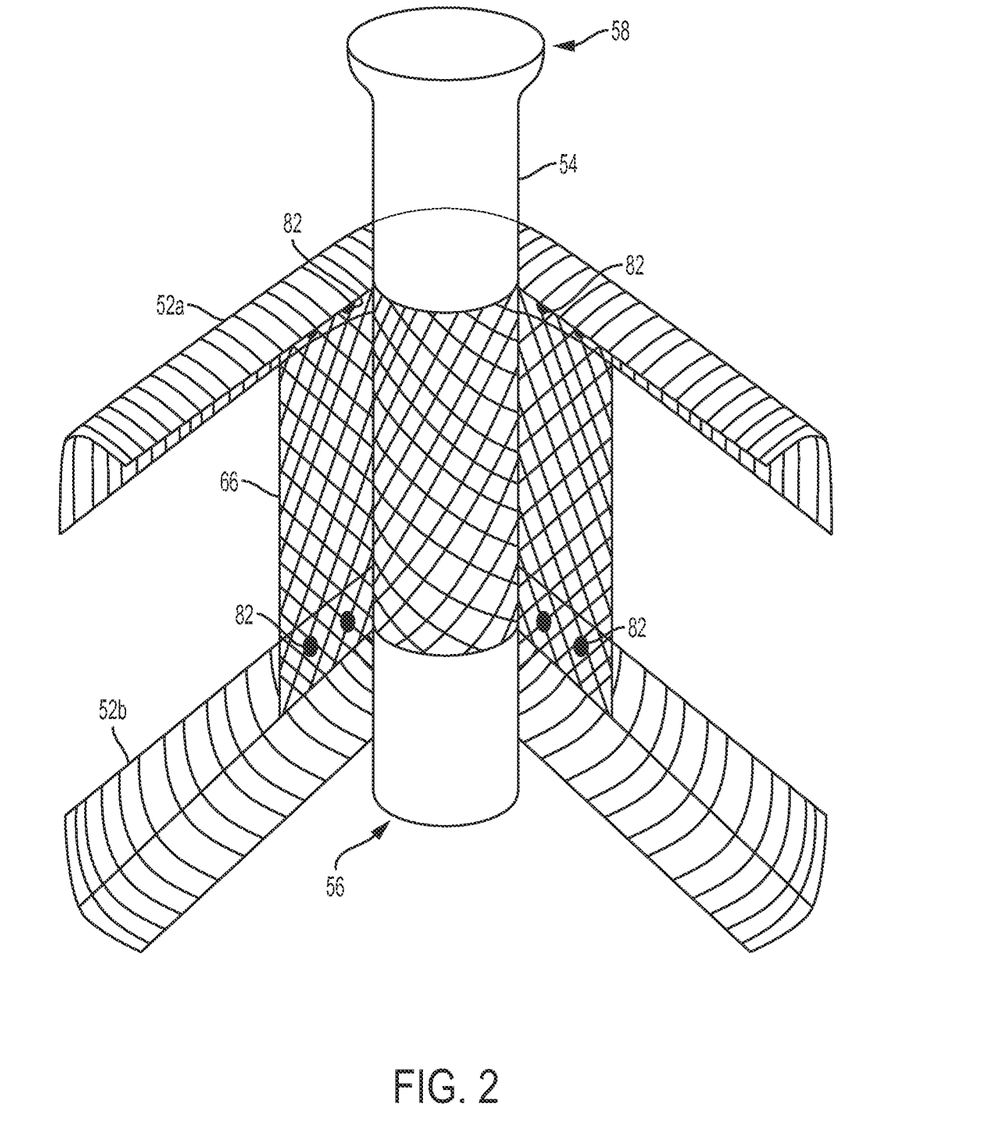
FIG. 2 depicts a perspective view of a joint that attaches a vertical pillar to a frame of the stackable satellite of FIG. 1.

FIG. 2 depicts a perspective view of a joint 66 that attaches a vertical pillar 54 to a frame 52 of the stackable satellite 50 of FIG. 1. The joint 66 such as a shear tie connects the vertical pillars 54 to an upper frame section 52a and lower frame section 52b of the satellite frame 52. The shear tie 66 wraps around the vertical pillar 54 to uniformly spread the vertical load of the satellite 50 to the four pillars.

The shear tie 66 can be fastened to the frames 52a, 52b through a permanent mechanical fastener such as rivets 82 or bolts. As shown, four upper fasteners 82 fasten the vertical pillars 54 to the upper frame section 52a and four lower fasteners fasten the vertical pillars 54 to the lower frame section 52b. As shown, four rivets 82 are used as upper fasteners and four additional rivets 82 are used as lower fasteners. The portion of the pillar 54 that contacts the shear tie 66 can have a slight circumferential recess to receive the shear tie to prevent any vertical slippage of the satellite 50 from the pillars 54.

The vertical pillars are permanently attached to the respective satellite 50 and is designed to be a permanent part even when the satellite separates into its unique orbit.

The vertical pillars 54 need to support the weight of the satellite 50 they are attached to and any other satellites above it. Accordingly, they need to be made of very high strength material. For example, alloy or composite such as austenite nickel-chromium-based super alloys (e.g., Inconel available from Special Metals Corporation of New Hartford, N.Y.) can be used.

While vertical pillars 54 receive substantially all of the vertical load of the satellites 50, the satellite frame 52 and the shear tie 66 only need to support the satellite's own mass. Accordingly, they can be made of relatively inexpensive materials such as aluminum, steel, synthetic fiber, glass fiber, carbon fiber material and the like. Preferably, the frame 52 includes carbon fiber material, which is relatively strong, stiff and light weight compared to metal such as aluminum.

Although the vertical pillars 54 are relatively expensive due to their structural integrity requirement of supporting the weight of multiple satellites, the pillars comprise only a very small portion of the payload. By contrast, the cost of the satellite frame 52 is relatively inexpensive and lightweight because they do not need to support the weight of any satellite 50 above its own frame. Consequently, substantial cost and weight savings over the conventional methods can be achieved.

Figure 3A:
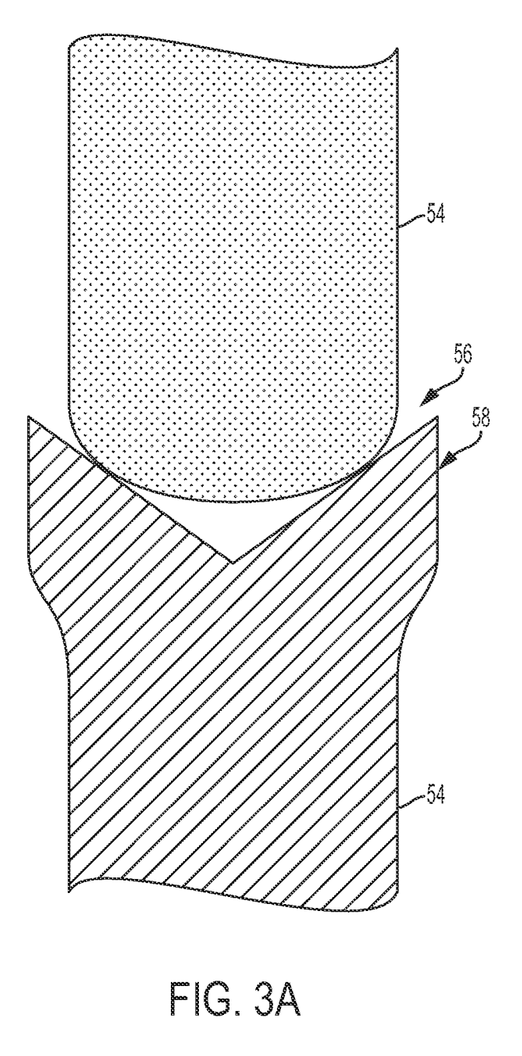
FIGS. 3A and 3B are cross-sectional views of upper and lower ends of a vertical pillar of the stackable satellite of FIG. 1 according to two different embodiments of the present invention.

FIG. 3A is a cross-sectional view of an upper end 56 of the vertical pillar 54 of one satellite 50 supporting a lower end 56 of the vertical pillar of a satellite immediately above it. As shown, the upper end 58 has a conical recess that receives and supports a slightly convexly curved shape (protruding portion) such as a spherical protrusion of the lower end 56. The conical recess of the upper end 58 provides vertical as well as lateral support of the satellite 50 above it.

Figure 3B:
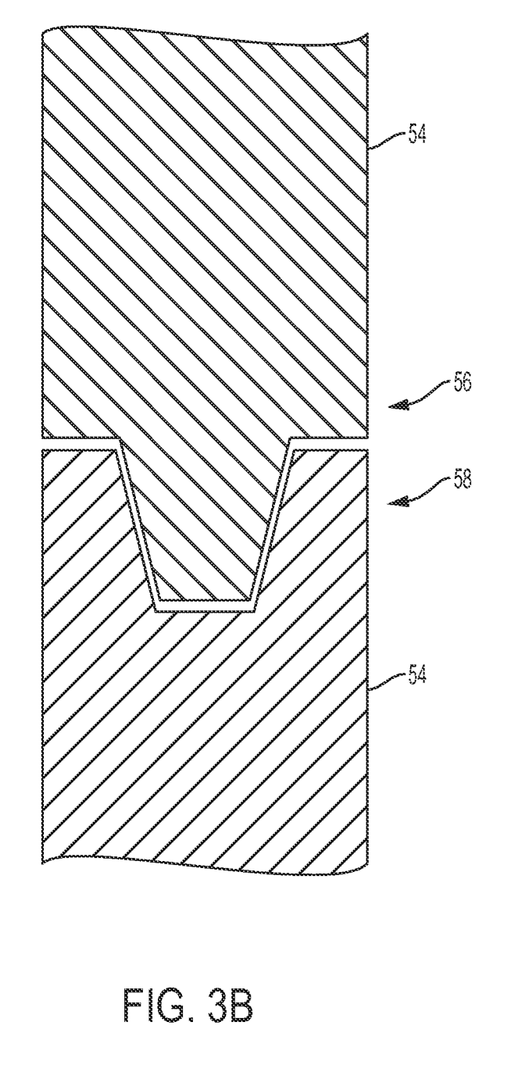

FIG. 3B is an alternative embodiment of the upper and lower ends 56, 58 of the vertical pillar 54. The upper end 58 has a frusto-conical shape (protruding portion) that supports and mates with a complimentary frusto-conical recess of the lower end 56 to provide even more lateral support than those of FIG. 3A.

Figure 4:
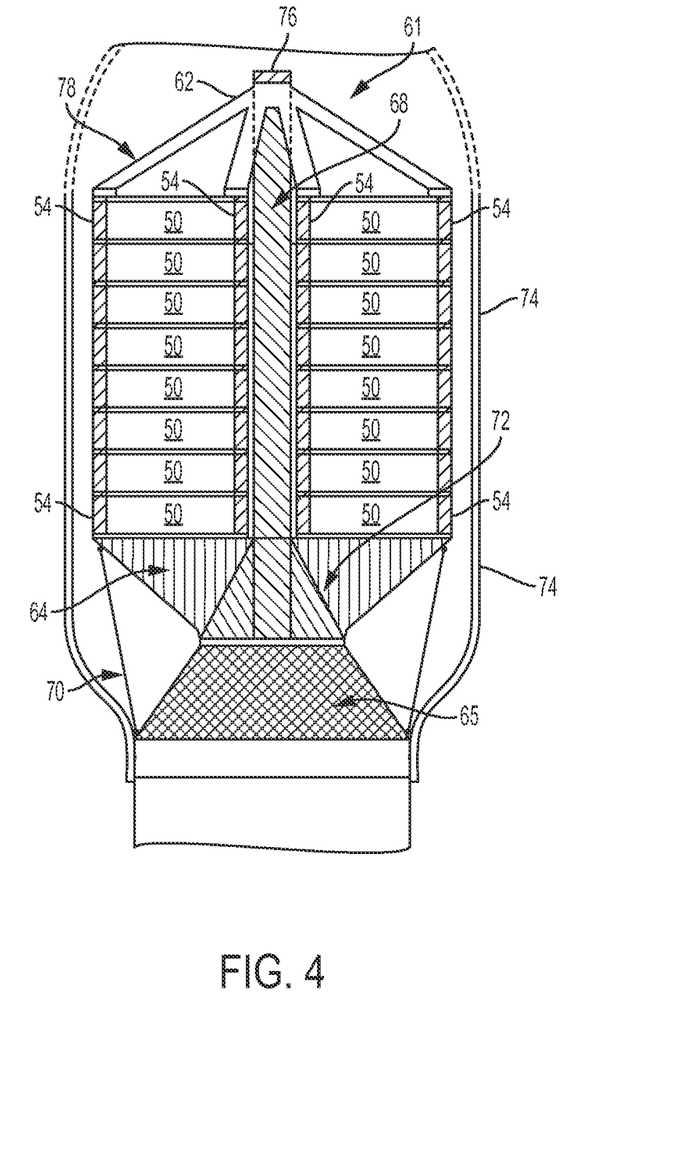
FIG. 4 is a cross-sectional side view of a plurality of stacked satellites using the stackable satellite of FIG. 1 according to one aspect of the present invention.

FIG. 4 is a cross-sectional side view of a plurality of stacked satellites using the stackable satellite of FIG. 1. In the embodiment shown, all of the satellites 50 and vertical pillars 54 are identical to each other. As shown in FIG. 4, the satellites 50 are stacked on top of each other such that the only contact between the vertically stacked satellites is through the vertical pillars 54. Specifically, the upper ends 58 of a vertical pillar 48 of each stackable satellite 50 couples to and supports respective lower ends 56 of the vertical pillars of the satellite immediately above it. Since the only vertical contact between satellites 50 is through the vertical pillars, the pillars receive substantially all of the vertical load of the satellite they are attached to as well as all of the stackable satellites above it. In other words, the satellite frame 52 receives substantially none of the vertical load of any stacked satellite above it.

As shown, a satellite fastener 61 includes an upper lid 62, a lower lid 64, tension shaft 68, tension shaft brace 72 and upper shaft bolt 76. The tension shaft 68 is positioned along the central axis of the launch vehicle to vertically compress the stack of satellites 50. The tension shaft 68 has a lower end which is attached to the lower lid 64 and an upper end attached to the upper lid 62.

A plurality of tension shaft braces 72 attached to the lower lid 64 laterally support the tension shaft 68. The lower lid 64 can be mounted directly onto an upper stage of the launch vehicle or indirectly mounted thereto through a payload adapter fitting (PAF) 65. If so, tension cables 70 secures attached to the lower lid 64 on one end and to the PAF 65 at the other end secures the lower lid to the launch vehicle.

The upper lid 62 has a central opening through which the bolt 76 is threaded. The bolt 76 attaches the lid 62 to the tension shaft 68. Similarly, the lower lid 64 has a central opening through which a bolt (not shown) attaches the lid to the tension shaft 68. The upper and lower lids 62, 64 have a plurality of struts 78.

Unlike the conventional dispenser that needs to support the weight of all satellites mounted thereto, the tension shaft 68 does not need to support such weight. Accordingly, the tension shaft 68 could be made substantially lighter and thinner than was previously necessary.

The distal ends of the struts 78 for the upper lid 62 are shaped to mate with respective upper ends 58 of the pillars 54 of the uppermost satellites 50 to apply downward pressure through respective outer pillars and inner pillars to reduce or eliminate the likelihood of a lateral satellite movement during launch. In other words, the distal ends of the struts 78 for the upper lid 62 are identical to the lower end 56 of the vertical pillars 54.

Similarly, the distal ends of the struts 78 for the lower lid 64 are shaped to mate with respective lower ends 56 of the pillars 54 of the lowermost satellites 50. Specifically, the distal ends of the struts 78 for the lower lid 64 are identical to the upper end 58 of the vertical pillars 54. The upper lid 62 and the bolt 76 are designed to be detached in orbit through known methods to allow the satellites 50 to be separated from the launch vehicle.

Figure 5:
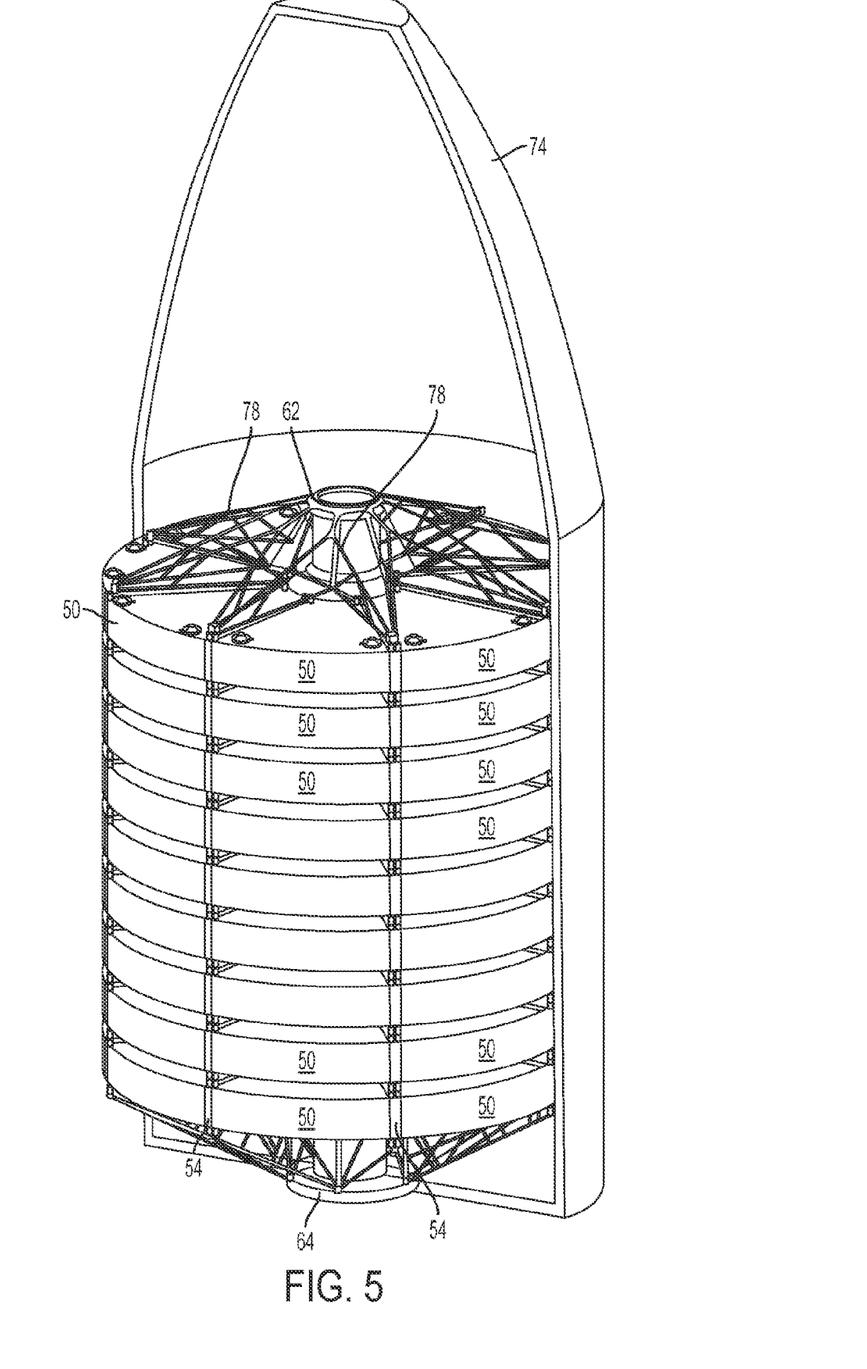
FIG. 5 depicts a perspective view of a plurality of stacked satellites using the stackable satellite of FIG. 1 according to another aspect of the present invention.

FIG. 5 is a perspective view of a plurality of stacked satellites using the stackable satellite of FIG. 1 according to another aspect of the present invention. For clarity, some parts of the satellite fastener 61 are not shown in this figure. As shown, eight stackable satellites 50 are arranges horizontally around a central vertical axis and nine satellites are stacked vertically for each column of satellites for a total of 72 satellites that can be launched in a single payload.

A novel use of vertical pillars in the satellite design has been described. The vertical pillars are designed to bypass the main static and dynamic loads of the satellites above. In this way, only the vertical pillars are designed for very high strength and stiffness without requiring the same performance criteria from the rest of the satellite structure. The use of such vertical pillars either removes the need for a dispenser or substantially lightens the dispenser mass to allow substantially more satellites to be carried in a payload as illustrated in FIG. 5, for example.

It is to be understood that the disclosure describes a few embodiments and that many variations of the invention can easily be devised by those skilled in the art after reading this disclosure. For example, while the inventive concepts disclosed herein are particularly suited to LEO and MEO satellites, they can also apply to other satellites. Accordingly, the scope of the present invention is to be determined by the following claims.

What is claimed is:

1. A stackable satellite comprising:
   a frame; and
   at least one vertical pillar attached to the frame and having an upper end and a lower end, the upper end adapted to be coupled to a lower end of a vertical pillar of an upper stackable satellite and the lower end adapted to be coupled to an upper end of a vertical pillar of a lower stackable satellite, wherein the vertical pillar receives substantially all of a vertical load of the stackable satellite and the upper stackable satellite.

2. The stackable satellite of claim 1, wherein the at least one vertical pillar includes at least three vertical pillars spaced from each other and the at least three vertical pillars receive substantially all of the vertical load of the stackable satellite and all upper stackable satellites.

3. The stackable satellite of claim 1, wherein:
   the frame includes at least four corners;
   the at least one vertical pillar includes at least four vertical pillars positioned at a respective one of the four corners; and
   the at least four vertical pillars receive substantially all of the vertical load of the stackable satellite and all upper stackable satellites.

4. The stackable satellite of claim 1, further comprising at least one shear tie that attaches the vertical pillar to the frame.

5. The stackable satellite of claim 4, wherein:
   the frame includes an upper section and a lower section; and
   the shear tie includes an upper fastener that fastens the vertical pillar to the upper section of the frame and a lower fastener that fastens the vertical pillar to the lower section of the frame.

6. The stackable satellite of claim 1, wherein the vertical pillar of the stackable satellite is coupled to the vertical pillars of the upper and lower satellites such that the only contact between vertically adjacent satellites is through the vertical pillar.

7. The stackable satellite of claim 1, wherein one of the two ends of the vertical pillar has a protruding portion and the other end of the vertical pillar has a recess shaped to receive the protruding portion of the one end.

8. A stackable satellite system comprising:
   a plurality of stackable satellites, each satellite having:
      a frame for supporting a plurality of satellite components;
      at least three vertical pillars attached to the frame, each vertical pillar having an upper end adapted to couple to and support the lower end of a respective vertical pillar of an upper stackable satellite and a lower end adapted to be coupled to and supported by the upper end of a respective vertical pillar of a lower stackable satellite, wherein the vertical pillar receives substantially all of a vertical load of the each satellite and all upper stackable satellites.

9. The stackable satellite system of claim 8, wherein the only contact between vertically adjacent satellites is through the vertical pillars.

10. The stackable satellite system of claim 8, further comprising a satellite fastener adapted to fasten the stackable satellites to a launch vehicle.

11. The stackable satellite system of claim 10, wherein the fastener includes a lid positioned above the uppermost one of the stackable satellites and applies downward pressure to the upper end of the vertical pillars of the uppermost satellite.

12. The stackable satellite system of claim 11, wherein the fastener further includes a shaft having a lower end attached to the launch vehicle and an upper end attached to the lid.

13. The stackable satellite system of claim 11, wherein there are V vertical levels of the stackable satellites that are stackable on top of each other and H number of horizontally arranged stackable satellites to provide a V by H number of satellites in a payload, wherein H is at least two.

14. The stackable satellite system of claim 13, wherein the lid includes a plurality of struts each having a distal end adapted to couple to a respective upper end of the vertical pillar of the uppermost satellite to apply downward pressure thereto.

15. A method of preparing a payload containing a plurality of stackable satellites comprising:
   vertically stacking a plurality of stackable satellites, each stackable satellite having
      a frame;
      at least one vertical pillar attached to the frame, and having an upper end and a lower end; and
      wherein the lower end of the vertical pillar of the each satellite is coupled to an upper end of the vertical pillar of a stackable satellite below the each satellite and the upper end of the vertical pillar of the each satellite is coupled to the lower end of the vertical pillar of a stackable satellite above the each satellite, the vertical pillar of the each satellite receiving substantially all of the vertical load of the each satellite and any other stackable satellite stacked above the each satellite; and
   fastening the stacked satellites to a launch vehicle to apply downward pressure through the vertical pillars of the stacked satellites.

16. The method of claim 15, wherein the step of stacking includes stacking the stackable satellites such that the only contact between vertically adjacent satellites is through the vertical pillar.

17. The method of claim 15, wherein the step of fastening includes:
   placing a lid above a top one of the stackable satellites; and
   applying downward pressure to the upper end of the vertical pillar of the top satellite.

18. The method of claim 17, wherein the step of fastening further includes attaching a lower end of a shaft to the launch vehicle and attaching an upper end to the lid.

19. The method of claim 17, wherein there are V vertical levels of the stackable satellites that are stacked on top of each other, the method further comprising:
   positioning H number of stackable satellites horizontally for each vertical level so as to provide a V by H number of satellites in the payload, wherein H is at least two.

20. The method of claim 19, wherein each satellite has at least three vertical pillars, the method further comprising placing a lid above top horizontally arranged satellites, the lid having a plurality of struts each having a distal end adapted to couple to a respective upper end of the vertical pillars of the top horizontally arranged satellites to apply downward pressure thereto.

\* \* \* \* \*